(12) United States Patent  
Hayashi

(10) Patent No.: US 6,625,301 B2  
(45) Date of Patent: Sep. 23, 2003

(54) IMAGE PROCESSING APPARATUS, IMAGE PROCESSING METHOD AND TRANSMISSION MEDIUM

(75) Inventor: Kazuyoshi Hayashi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/320,114

(22) Filed: Dec. 16, 2002

(65) Prior Publication Data

US 2003/0086589 A1 May 8, 2003

Related U.S. Application Data

(62) Division of application No. 09/123,089, filed on Jul. 27, 1998, now Pat. No. 6,526,157.

(30) Foreign Application Priority Data

Aug. 1, 1997 (JP) .............................. 9-207952  
Aug. 1, 1997 (JP) .............................. 9-207954

(51) Int. Cl.⁷ ................................ G06K 9/00
(52) U.S. Cl. ........................................ 382/106; 356/3
(58) Field of Search ................... 382/106, 278, 382/103, 154, 254, 255, 275, 192, 107; 356/3, 608, 337; 348/229.1, 625, 148; 396/104; 702/142; 345/173; 250/559.05

(56) References Cited

U.S. PATENT DOCUMENTS

| | | | |
|---|---|---|---|
| 4,573,191 A | * 2/1986 | Kidode et al. .............. 382/106 |
| 4,601,053 A | 7/1986 | Grumet | |
| 4,906,940 A | 3/1990 | Greene et al. | |
| 5,166,533 A | * 11/1992 | Kajiwara ............... 250/559.05 |
| 5,642,299 A | 6/1997 | Hardin et al. | |
| 5,668,631 A | * 9/1997 | Norita et al. ............... 356/608 |
| 5,734,743 A | 3/1998 | Matsugu et al. | |
| 5,764,871 A | 6/1998 | Fogel | |
| 5,768,404 A | 6/1998 | Morimura et al. | |
| 5,905,567 A | * 5/1999 | Dewan ...................... 356/3.06 |
| 5,906,530 A | * 5/1999 | Lindsey ....................... 446/85 |
| 5,956,424 A | 9/1999 | Wootton et al. | |
| 6,097,429 A | 8/2000 | Seeley et al. | |
| 6,192,163 B1 | * 2/2001 | Murayama .................. 382/274 |
| 6,414,672 B2 | 7/2002 | Rekimoto et al. | |
| 6,424,370 B1 | 7/2002 | Courtney | |
| 6,445,409 B1 | 9/2002 | Ito et al. | |
| 2002/0005778 A1 | * 1/2002 | Breed et al. ................ 340/435 |
| 2002/0006279 A1 | * 1/2002 | Ide .............................. 396/79 |
| 2002/0080135 A1 | * 6/2002 | Sakakibara ................. 345/419 |
| 2002/0085747 A1 | * 7/2002 | Yoshigahara et al. ....... 382/154 |
| 2002/0131056 A1 | * 9/2002 | Fujii et al. .................. 356/608 |

* cited by examiner

Primary Examiner—Bhavesh M. Mehta  
Assistant Examiner—Barry Choobin  
(74) Attorney, Agent, or Firm—Lerner, David, Littenberg, Krumholz & Mentlik, LLP

(57) ABSTRACT

The invention intends to achieve higher accuracy and higher speeds in image processing based on a stereo method. Images from a plurality cameras are applied to respective image input portions and stored in built-in memories. The stored images are then read out in a certain sequence to cancel lens aberrations of the cameras, and output to respective SAD circuits after being compensated for the differences of intensity values due to variations in the characteristics of the cameras. The SAD circuit calculates an absolute value of the difference for each pixel value between a reference image output from a reference camera and two compared images output from another two cameras, and outputs the calculated value to an SSAD circuit. The SSAD circuit performs a block matching process upon outputs from the corresponding SAD circuit, and outputs the obtained results to a second-order portion. The second-order portion performs second-order interpolation upon the data output from the corresponding SSAD circuit and outputs an obtained result. A minimum value selecting portion and a result memory cooperate to select a minimum value from among the data output from the second-order portions.

16 Claims, 6 Drawing Sheets

IMAGE PROCESSING APPARATUS, IMAGE PROCESSING METHOD AND TRANSMISSION MEDIUM

CROSS-REFERENCE TO RELATED APPLICATIONS

The present application is a divisional application of U.S. patent application Ser. No. 09/123,089 now U.S. Pat. No. 6,526,157 filed Jul. 27, 1998, entitled IMAGE PROCESSING APPARATUS, IMAGE PROCESSING METHOD AND TRANSMISSION MEDIUM, the entire disclosure of which is hereby incorporated by reference.

BACKGROUND OF THE INVENTION

The present invention relates to an image processing apparatus, an image processing method and a transmission medium, and more particularly to an image processing apparatus, an image processing method and a transmission medium which are used for calculating a distance to a target point with a stereo method.

The so-called stereo method is a technique to measure a distance to a target point based on the principle of triangular surveying by using images picked up from a plurality of visual points.

FIG. 1 shows an example of configuration of a conventional image processing apparatus for measuring a distance to a target point with the stereo method.

In FIG. 1, memories 901-1 to 901-5 store one-frame images picked up by cameras 1 to 5, respectively, and image data are read out of the memories to be output in predetermined sequence. Of the cameras 1 to 5, the camera 1, for example, is set as a reference camera. An image of the reference camera is compared with each of the other cameras (compared cameras) to perform a matching process, and a parallax is calculated in accordance with a result of the matching process.

An SAD (Sum of Absolute Difference) circuit 902 calculates an absolute value of difference for each pixel value between the reference image output from the memory 901-1 and each of the images output from the other memories 901-2 to 901-5. For example, the SAD circuit 902 calculates absolute values of differences for each pixel value between the memories 901-1 and 901-2, between the memories 901-1 and 901-3, between the memories 901-1 and 901-4, and between the memories 901-1 and 901-5, and then outputs the absolute values.

An SSAD (Sum of SAD) circuit 903 outputs results of an inter-camera block matching process performed based on the absolute values of differences in pixel value between the cameras.

A minimum value detecting portion 904 detects a minimum value from among the results output from the SSAD circuit 903.

A second-order portion 905 performs approximation (interpolation) for the minimum value output from the minimum value detecting portion 904 and other values thereabout by using a second-order function to calculate a minimum value with higher accuracy.

A memory 906 stores the minimum value output from the second-order portion 905.

The operation of the conventional image processing apparatus thus constructed will be described below.

Assume now that the camera 1 is disposed at the center and the other cameras 2 to 5 are disposed so as to surround the camera 1. An image output from the camera 1 is stored as a reference image in the memory 901-1. Images output from the other cameras 2 to 5 are stored respectively in the memories 901-2 to 901-5.

The SAD circuit 902 creates a pair of the reference image output from the memory 901-1 and each of compared images output from the other memories 901-2 to 901-5, and then calculates and outputs an absolute value of difference for each pixel value between both the images of each pair.

The SSAD circuit 903 performs a matching process for a predetermined pixel block (e.g., a 5×5 block) based on the absolute values of differences in pixel value for each pair of the images output from the SAD circuit 902. In other words, the SSAD circuit 903 calculates a difference value in units of a pixel block, and supplies calculated results to the minimum value detecting portion 904.

The minimum value detecting portion 904 detects a minimum value from among the difference values output from the SSAD circuit 903, and supplies the detected minimum value to the second-order portion 905.

The second-order portion 905 performs approximation (interpolation) for the minimum value output from the minimum value detecting portion 904 and other data of two points thereabout by using a second-order function to create and output a minimum value with higher accuracy.

The memory 906 stores data output from the second-order portion 905.

In processing based on the stereo method, it is required to solve the problem of corresponding points, i.e., determining which pixel of a compared image each pixel of a reference image corresponds. The problem of corresponding points is generally solved by a matching process. Stated otherwise, by comparing the reference image and the compared image, portions showing a maximum matching (similarity) therebetween are determined as corresponding points and correlated to each other.

When searching the corresponding points based on the matching process, a search area is decided beforehand by previous calibration. Theoretically the search area should exist along a straight line called an Epipolar line, but practically it exists along a curved line due to lens aberrations, etc. in many cases.

To overcome such a problem, it is thought to list all search points and store them in a lookup table beforehand. Even in the case of using the lookup table thus created, an intensity value of each pixel may differ between cameras of differences in the kinds of lenses and diaphragms used, resulting in a problem that the matching process cannot be precisely performed.

With a view of overcoming the above problem, processing to compress an input image into 4 bits and to emphasize a portion, where an intensity value changes to a large extent, for absorbing a difference of the intensity value has been proposed (see "A Stereo Machine for Video-rate Dense Depth Mapping and Its New Applications", Takeo Kanade, Atsushi Yoshida, Kazuo Oda, Horoshi Kano and Masaya Tanaka, Proceedings of 15th Computer Vision and Pattern Recognition Conference (CVPR), Jun. 18–20, 1996, San Francisco).

With this proposed method, however, a fine intensity difference of an original image is ignored and cannot be reflected on a result of the matching process. Hence there has been a problem that a correct result of the matching process is obtained in a portion where changes of the intensity value are large, while a correct result of the matching process cannot be obtained in a portion where changes of the intensity value are small.

Further, because it is desired that distance data resulting from the matching process be obtained with as high an accuracy as possible, the conventional image processing apparatus mentioned above is designed to perform interpolation for minimum value data, which results from searching the corresponding point, by using a second-order curve and obtain data with higher accuracy.

Executing the interpolation however requires a division process which entails a relatively high computing cost. To reduce a circuit scale needed, therefore, the interpolation has been hitherto executed only upon a minimum value among results obtained from the block matching process (i.e., output of the minimum value detecting portion 904). This method can reduce a hardware scale, but causes a delay in the overall process because the interpolation is required to be executed after the minimum value has been output. Accordingly, this method has caused difficulty in speeding up the processing.

Further, it is important in the stereo method to improve accuracy of a distance to the target point. From this point of view, a stereo processing using a plurality of cameras and a plurality of base line lengths (distances between the cameras) has been proposed, by way of example (see "Stereo Matching Utilizing a Plurality of Base Line Lengths", Journal of The Institute of Electronics, Information and Communication Engineers (Japan), D-II, Vol. J75-D-II No. 8, pp. 1317–1327, August 1992).

With this proposed method, an error in matching can be reduced and distance accuracy can be improved as a result of using a plurality of cameras in a combined manner.

In the proposed method, however, the stereo processing is executed in accordance with one combination of the plural cameras (i.e., by using all the cameras in one combination). Therefore, the proposed method has had difficulty in dealing with the problem of occlusion and hence a disadvantage that distance accuracy is lowered.

With the above in mind, it has also been proposed to prepare several combinations of cameras and to select the best one of those combinations.

That method can improve distance accuracy, but has accompanied another problem that when selecting the best one of the several combinations, if search areas are different between cameras, it is very intricate to deal with such a case.

Further, when implementing the above method with hardware, there has occurred a problem of requiring a longer processing time. Specifically, because an amount of data to be processed is different for each camera, the step of selecting the best combination must wait, until processing for all the combinations has been completed.

SUMMARY OF THE INVENTION

The present invention has been made in view of the state of art described above, and its object is to enable a matching process to be executed precisely and at a high speed. Another object is to improve distance accuracy and to simplify processing in the case of searching the corresponding points using a plurality of cameras based on a stereo method.

To achieve the above objects, according to a first aspect of the present invention, there is provided an image processing apparatus for calculating a distance to a target point with image processing based on images picked up by a plurality of image pickup devices, the apparatus comprising a first input device for receiving, as a reference image, an image supplied from one of the plurality of image pickup devices; a second input device for receiving, as a compared image, an image supplied from another image pickup device; a matching device for performing a matching process between the reference image and the compared image applied from the first and second input devices; an interpolating device for performing interpolation for data obtained by the matching device; and a detecting device for detecting a minimum value from among data resulting from the interpolation performed by the interpolating device.

According to a second aspect of the present invention, there is provided an image processing method for calculating a distance to a target point with image processing based on images picked up by a plurality of image pickup devices, the method compromising: receiving, as a reference image, an image supplied from one of the plurality of image pickup devices; receiving, as a compared image, an image supplied from another image pickup device; performing a matching process between the reference image and the compared image; performing interpolation for data obtained from the matching step; and detecting a minimum value from among data resulting from the interpolating step.

According to a third aspect of the present invention, there is provided a transmission medium for transmitting a computer program used in an image processing apparatus for calculating a distance to a target point with image processing based on images picked up by a plurality of image pickup devices, the medium transmitting a program comprising: receiving, as a reference image, an image supplied from one of the plurality of image pickup devices; receiving, as a compared image, an image supplied from another image pickup device; performing a matching process between the reference image and the compared image; performing interpolation for data obtained by the matching step; and detecting a minimum value from among data resulting from the interpolating step.

According to a fourth aspect of the present invention, there is provided an image processing apparatus for calculating a distance to a target point with image processing based on images picked up by a plurality of image pickup devices, the apparatus comprising: a first storage device for storing an image output from each of the plurality of image pickup devices; a second storage device for storing a sequence of reading out pixel data constituting the image stored in the first storage unit; a reading unit for reading out the pixel data stored in the first storage unit in accordance with the sequence stored in the second storage unit; and a converting unit for converting gradation of the pixel data read out by the reading unit.

According to a fifth aspect of the present invention, there is provided an image processing method for calculating a distance to a target point with image processing based on images picked up by a plurality of image pickup devices, the method comprising: storing an image output from each of the plurality of image pickup devices; reading out pixel data, which constitute the image stored in the storing step, in accordance with a reading sequence stored beforehand; and converting gradation of the pixel data read out in the reading step.

According to a sixth aspect of the present invention, there is provided a transmission medium for transmitting a computer program used in an image processing apparatus for calculating a distance to a target point with image processing based on images picked up by a plurality of image pickup devices, the medium transmitting a program comprising:

storing an image output from each of the plurality of image pickup devices; reading out pixel data, which constitute the image stored in the storing step, in accordance with a reading sequence stored beforehand; and converting gradation of the pixel data read out in the reading step.

According to a seventh aspect of the present invention, there is provided an image processing apparatus for calculating a distance to a target point with image processing based on images picked up by a plurality of image pickup devices, the apparatus comprising: a first input unit for receiving, as a reference image, an image supplied from one of the plurality of image pickup devices; a second input unit for receiving, as a compared image, an image supplied from another image pickup device; a searching unit for searching an area, which corresponds to a predetermined area of the reference image applied from the first input unit, from the compared image applied from the second input unit by a matching process; a detecting unit for detecting if the area searched by the searching unit is outside a region of the compared image; and a control unit for controlling the matching process performed by the searching unit in accordance with a result detected by the detecting unit.

According to an eighth aspect of the present invention, there is provided an image processing method for calculating a distance to a target point with image processing based on images picked up by a plurality of image pickup devices, the method comprising: receiving, as a reference image, an image supplied from one of the plurality of image pickup devices; receiving, as a compared image, an image supplied from another image pickup device; searching an area, which corresponds to a predetermined area of the reference image from the compared image by a matching process; detecting if the area searched in the searching step is outside a region of the compared image; and controlling the matching process performed in the searching step in accordance with a result detected in the detecting step.

According to a ninth aspect of the present invention, there is provided a transmission medium for transmitting a computer program used in an image processing apparatus for calculating a distance to a target point with image processing based on images picked up by a plurality of image pickup devices, the medium transmitting a program comprising: receiving, as a reference image, an image supplied from one of the plurality of image pickup devices; receiving, as a compared image, an image supplied from another image pickup device; searching an area, which corresponds to a predetermined area of the reference image, from the compared image by a matching process; detecting if the area searched in the searching step is outside a region of the compared image; and controlling the matching process performed in the searching step in accordance with a result detected in the detecting step.

DESCRIPTION OF THE PREFERRED EMBODIMENTS

Figure 1:
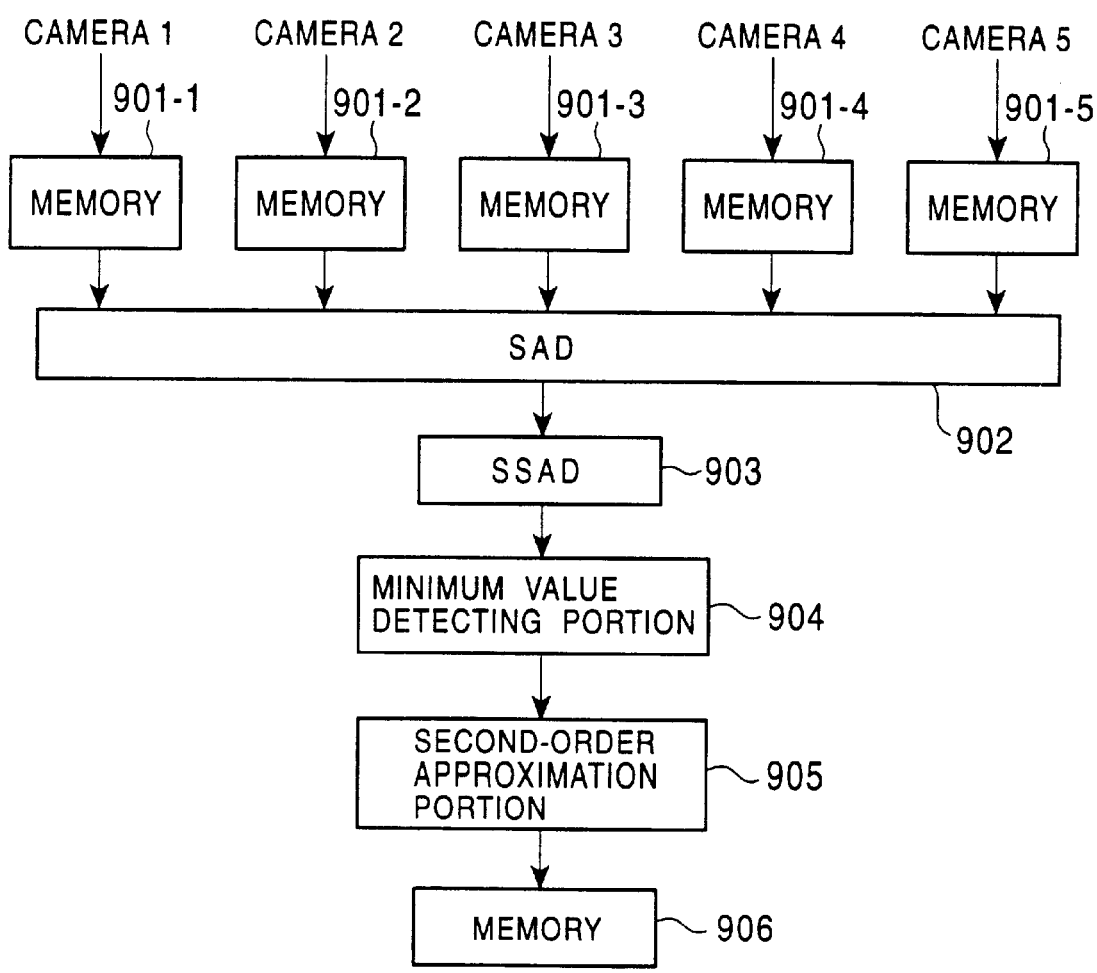
FIG. 1 is a block diagram showing an example of a configuration of a conventional image processing apparatus.
Figure 2:
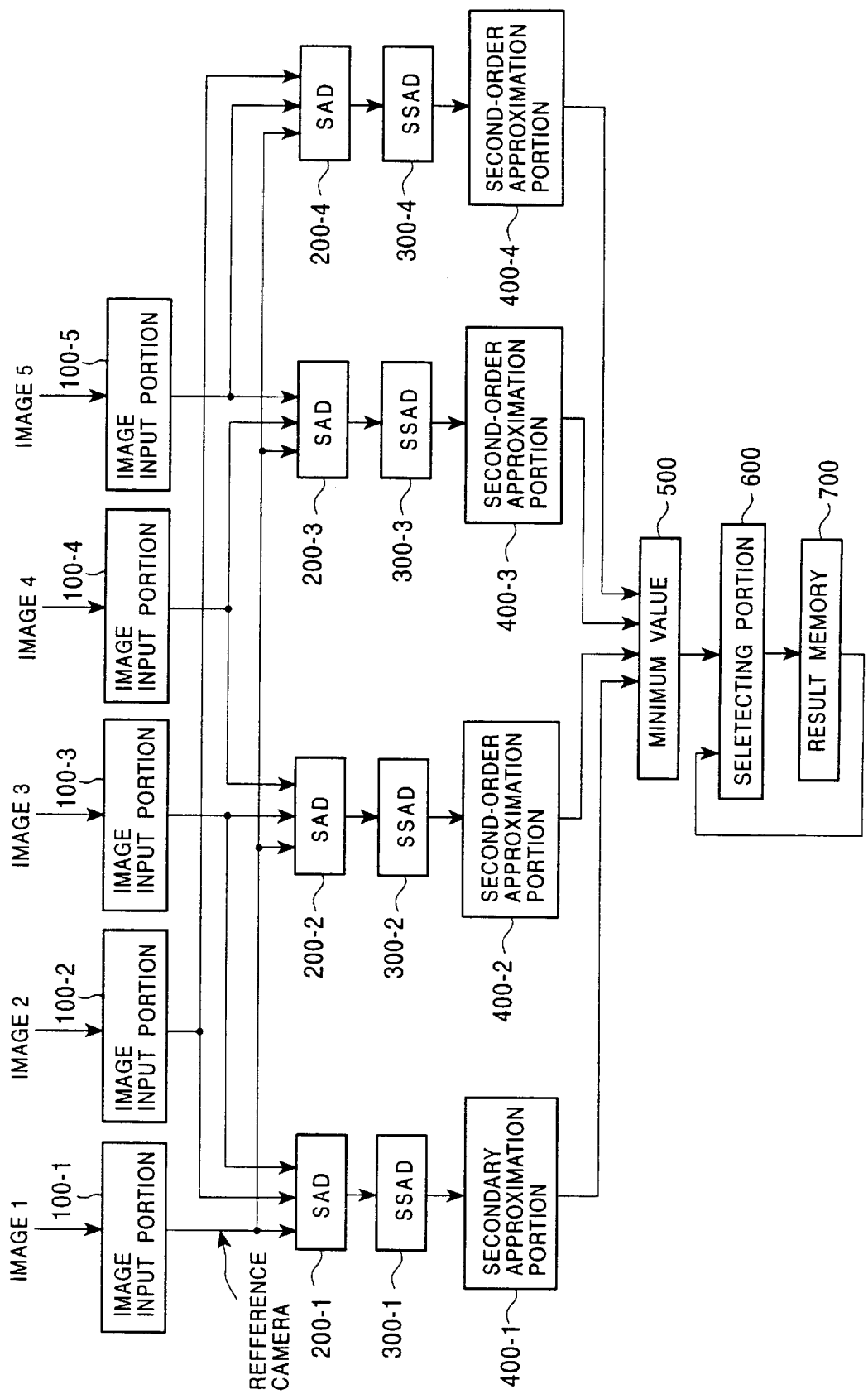
FIG. 2 is a block diagram showing an example of a configuration of an image processing apparatus according to an embodiment of the present invention.

FIG. 2 is a block diagram showing an example of configuration of an image processing apparatus according to an embodiment of the present invention. Note that the embodiment will be described with reference to the block diagram, the apparatus of the invention is not restricted to hardware only in its construction, but may be constructed with a combination of software and hardware. For example, the apparatus of the invention can be constructed by a program describing the processing set forth below, a CPU (Central Processing Unit) for executing the program, a transmission medium (e.g., a recording medium such as ROM, floppy disk, CD-ROM, magnetic disk and optical disk, or a communication medium such as a telephone line and network), a RAM for storing data, control commands, etc. under control of the CPU, an input/output interface connected to external equipment for inputting and outputting signals, a display unit for displaying an image, and an input device through which a user enters instructions. Also, a semiconductor chip such as an LSI may be designed so as to execute the processing required.

In FIG. 2, an image input portion 100-1 and other image input portions 100-2 to 100-5 store images 1 to 5 output from cameras 1 to 5 (not shown), respectively. The stored images are read out in such a predetermined sequence as to cancel lens aberrations, and then are output after pixel values have been subjected to gradation conversion in accordance with a lookup table. An example of a detailed configuration of each of the image input portions 100-1 to 100-5 will be described later with reference to FIG. 3.

It is assumed that the image output from the camera 1 is a reference image and the images output from the other cameras 2 to 5 are images to be compared.

SAD circuits 200-1 to 200-4 each calculate absolute values of differences for each pixel value between the reference image and two compared images. For example, the SAD circuit 200-1 receives the reference image (i.e., the image output from the image input portion 100-1) and the images output from the cameras 2 and 3 (i.e., the images output from the image input portions 100-2 and 100-3), and then calculate absolute values of differences for each pixel value between those images. Details of the SAD circuits 200-1 to 200-4 will be described later with reference to FIG. 4.

SSAD circuits 300-1 to 300-4 each calculate and output difference values in units of a pixel block comprising, for example, 5×5 pixels. Details of the SSAD circuits 300-1 to 300-4 will be described later with reference to FIG. 5.

Second-order portions 400-1 to 400-4 each receive three difference values output from each of the SSAD circuits 300-1 to 300-4, determine a second-order curve passing through those three points, and then determine and output a minimum value of the second-order curve. Details of the second-order portions 400-1 to 400-4 will be described later with reference to FIG. 6.

A minimum value selecting portion 500 selects and outputs a minimum value from among the data output from the second-order portions 400-1 to 400-4.

A minimum value selecting portion 600 compares a new minimum value output from the minimum value selecting portion 500 with a preceding minimum value stored in a result memory 700, and then selects and outputs the smaller between the minimum values.

The result memory 700 temporarily stores the minimum value output from the minimum value selecting portion 600, and also supplies the preceding minimum value stored therein to the minimum value selecting portion 600.

The minimum value selecting portion 600 and the result memory 700 cooperate to select data having a minimum value from among a series of data output from the minimum value selecting portion 500 and to store the selected data in the result memory 700.

An example of a detailed configuration of each image input portion 100 (100-1 to 100-5) shown in FIG. 2 will now be described with reference to FIG. 3.

Figure 3:
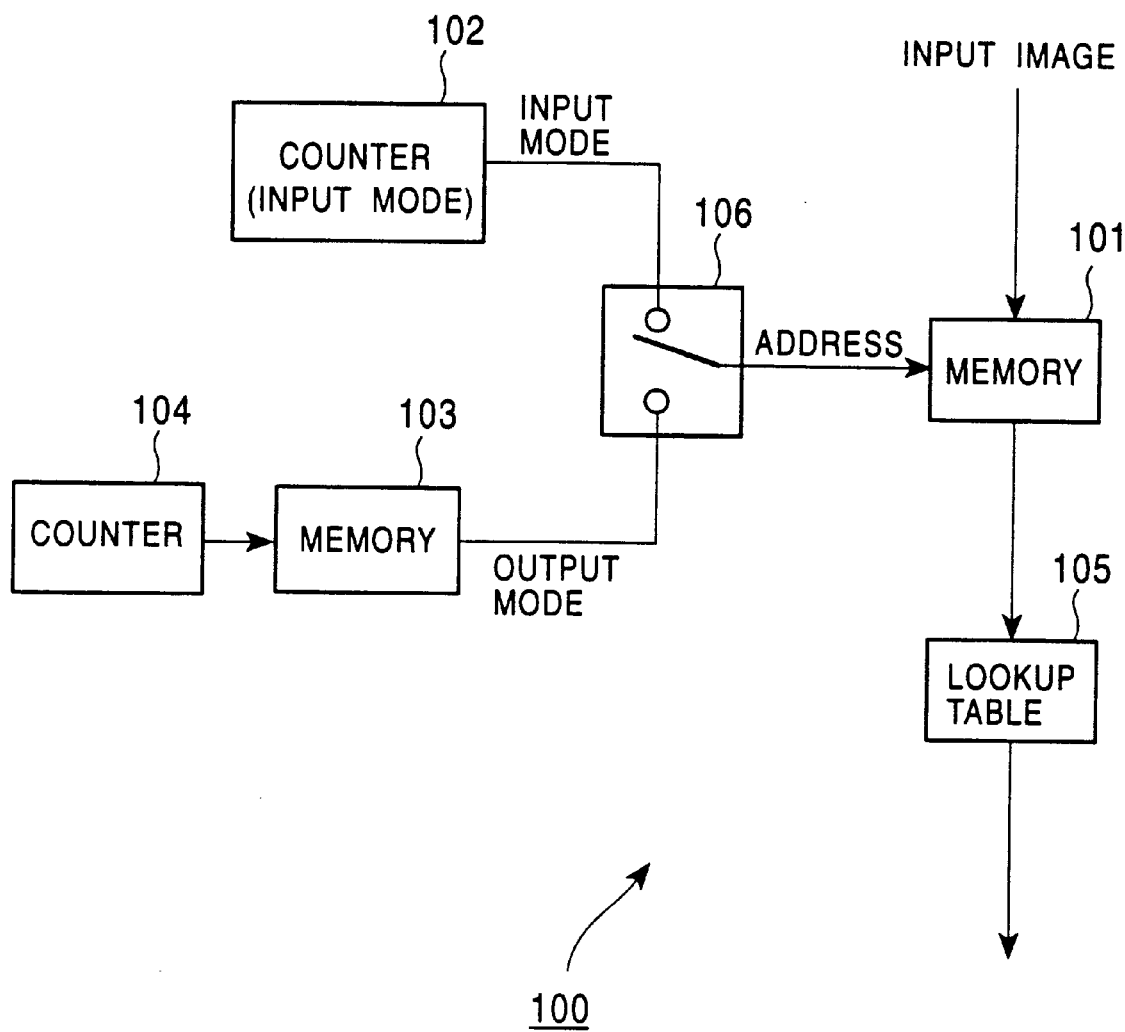
FIG. 3 is a block diagram showing an example of a detailed configuration of an image input portion shown in FIG. 2.

In FIG. 3, a memory 101 stores image data output from the camera in addresses corresponding to address data output from a counter 102. When reading out the data stored in the memory 101, the data are read and output from addresses corresponding to address data output from a memory 103. A selector 106 is connected to the side of the counter 102 when the image data are input to the memory 101, and connected to the side of the memory 103 when the image data are output from the memory 101.

The counter 102 outputs the address data, e.g., in the order from the smallest, when the image data are read into the memory 101.

A counter 104 outputs address data in predetermined sequence. The memory 103 outputs the address data output from the counter 104 after converting them in such a manner as to cancel lens aberrations. Data stored in the memory 103 to be used for the address conversion are created in consideration of the corresponding point at the time of making calibration.

Further, the data stored in the memory 103 are each added with an effective bit. If a search area determined beforehand for each camera exceeds an image region, the effective bit is set to "0", and therefore an effective bit signal output from the memory 103 takes a state of "0". If the search area is within the image region, the effective bit signal output from the memory 103 takes a state of "1".

A lookup table 105 stores data used for gradation conversion, and outputs data that are read out from addresses corresponding to the input data. The data stored in the lookup table 105 are set such that when an image of the same pattern is picked up by the cameras 1 to 5, outputs of all the camera become identical to one another. In other words, variations in characteristics of the cameras are compensated by using the lookup table 105.

An example of a detailed configuration of each SAD circuit 200 (200-1 to 200-4) shown in FIG. 2 will be described with reference to FIG. 4.

Figure 4:
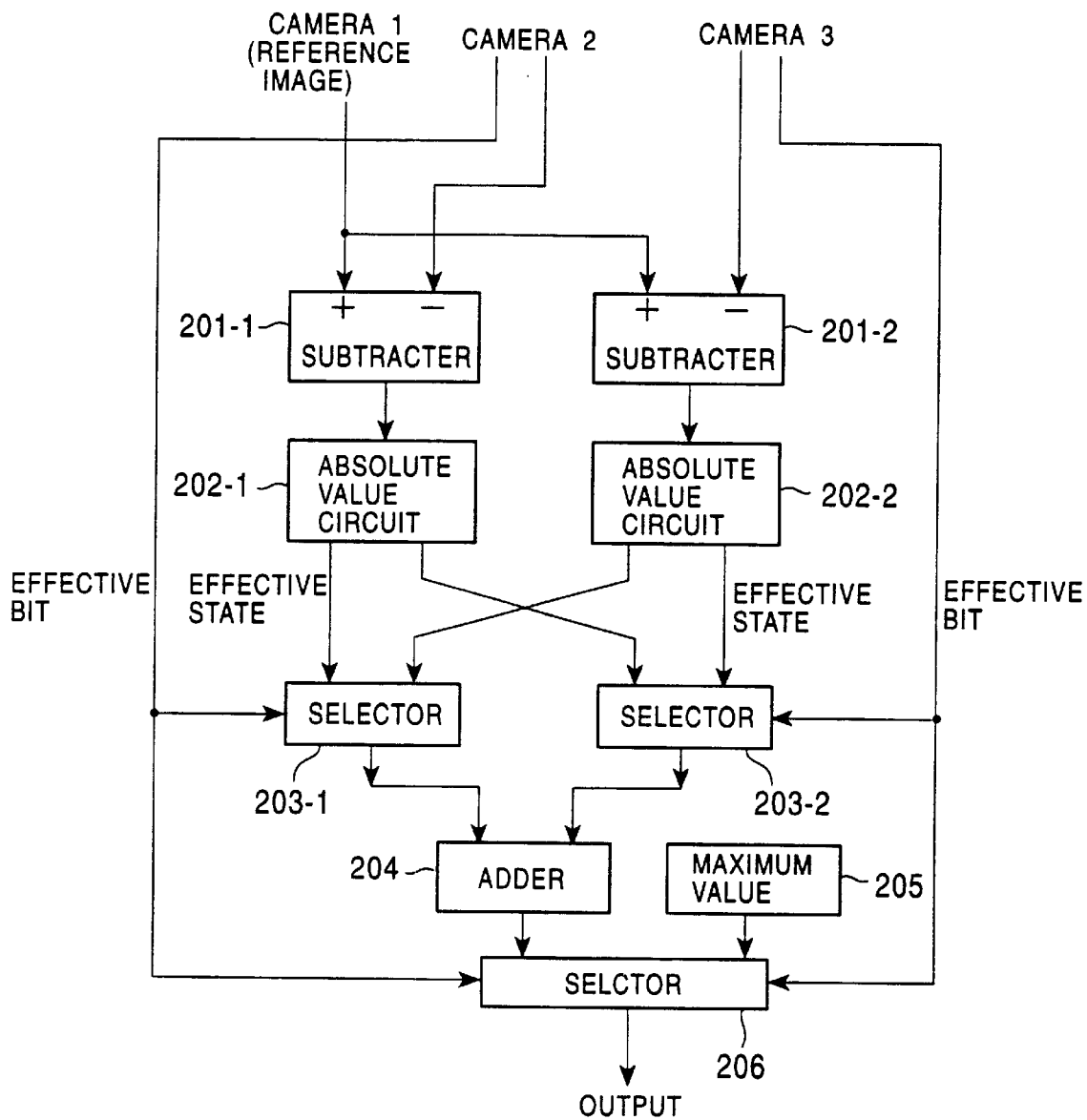
FIG. 4 is a block diagram showing an example of a detailed configuration of an SAD circuit shown in FIG. 2.

In FIG. 4, a subtracter 201-1 subtracts a pixel value of the compared image output from the camera 2 from a pixel value of the reference image output from the camera 1, and then outputs a difference value. A subtracter 201-2 subtracts a pixel value of the compared image output from the camera 3 from the pixel value of the reference image output from the camera 1, and then outputs a difference value.

An absolute value circuit 202-1 calculates and outputs an absolute value of data output from the subtracter 201-1. An absolute value circuit 202-2 calculates and outputs an absolute value of data output from the subtracter 201-2.

A selector 203-1 selects and outputs an output of the absolute value circuit 202-1 when the effective bit for the camera 2 takes a state of "1". On the other hand, when the effective bit for the camera 2 takes a state of "0", the selector 203-1 selects and outputs an output of the absolute value circuit 202-2.

A selector 203-2 selects and outputs the output of the absolute value circuit 202-2 when the effective bit for the camera 3 takes a state of "1". On the other hand, when the effective bit for the camera 3 takes a state of "0", the selector 203-2 selects and outputs the output of the absolute value circuit 202-1.

An adder 204 adds an output of the selector 203-1 and an output of the selector 203-2, and outputs the sum of both the outputs.

A selector 206 selects and outputs an output of the adder 204 when the effective bit for at least one of the cameras 2 and 3 takes a state of "1". When the effective bits for both the cameras take a state of "0", the selector 206 selects and outputs data (e.g., a value 511 in the case of the pixel data being of 8 bits) output from a maximum value circuit 205.

An example of a detailed configuration of each SSAD circuit 300 (300-1 to 300-4) shown in FIG. 2 will be described with reference to FIG. 5.

Figure 5:
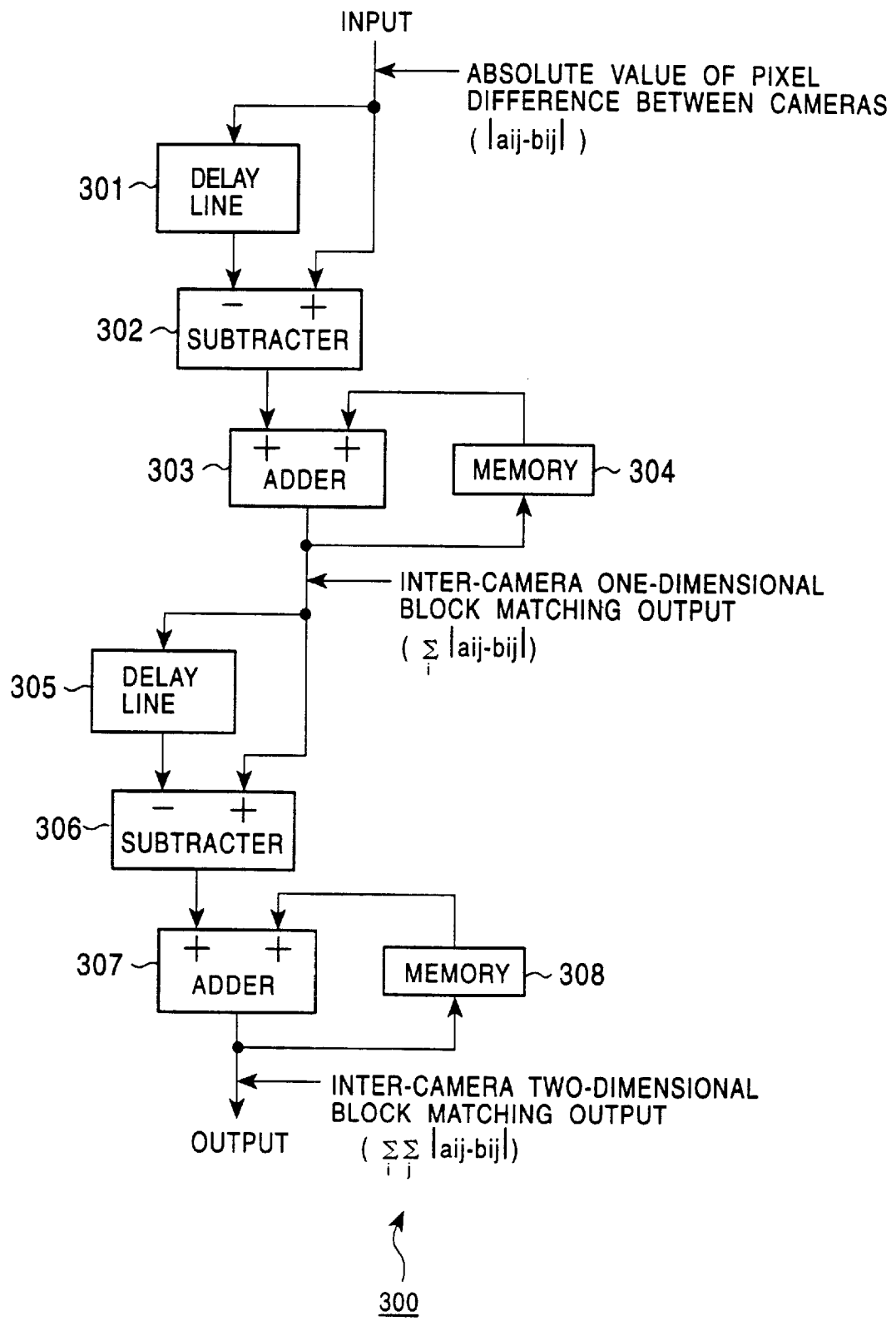
FIG. 5 is a block diagram showing an example of a detailed configuration of an SSAD circuit shown in FIG. 2.

In FIG. 5, a delay line 301 delays the received absolute value of difference for each pixel value by a period corresponding to the product of the size of a block used for block matching by the number of pixels per line, and then outputs the delayed value.

A subtracter 302 subtracts data output from the delay line 301 from data applied thereto without passing the delay line 301, and then outputs a subtracted result.

An adder 303 adds data output from the subtracter 302 and data output from a memory 304, and outputs the sum of both data. The memory 304 delays data output from the adder 303 by a period corresponding to one line, and outputs the delayed data.

A delay line 305 delays an output of the adder 303 by a period corresponding to number of pixels per line, and then outputs the delayed output. A subtracter 306 subtracts data output from the delay line 301 from data applied thereto without passing the delay line 301, and then outputs a subtracted result.

An adder 307 adds an output of the subtracter 306 and an output of a memory 308, and outputs the sum of both the outputs. The memory 308 delays an output of the adder 307 by a period corresponding to the size of the block used for block matching.

The operation of this embodiment thus constructed will be described below.

When the images output from the cameras 1 to 5 are applied to the image processing apparatus of this embodiment shown in FIG. 2, the image input portions 100-1 to 100-5 once store those images therein. Then, the stored images are read out in the predetermined sequence and output after having been subjected to the gradation conversion.

More specifically, when the image data is supplied to the memory 101 shown in FIG. 3, the image data are successively stored in addresses corresponding to the address data output from the counter 102. Such an operation is executed in all of the image input portions 100-1 to 100-5, and the image data output from the cameras 1 to 5 are each successively stored in predetermined addresses of the memory 101 of each image input portion. At this time, the selector 106 is positioned to select the side of the counter 102.

When the image data are completely stored, the selector 106 is connected to the side of the memory 103. Then, the counter 104 starts outputting the address data.

The memory 103 reads out predetermined data from addresses corresponding to the address data output from the counter 104, and then supplies the read-out data to the memory 101. The data stored in the memory 103 are set such that the image data are read out not only for each pixel but also for each search disparity. As a result, it is possible to cope with the case where the Epipolar line along which search is to be performed is not linear, and to absorb lens aberrations and so on.

Further, as described above, the data stored in the memory 103 are each added with an effective bit, and the effective bit takes a state of "0" if the search area determined beforehand for each camera exceeds the image region. On the other hand, if the search area is within the image region, the effective bit takes a state of "1".

The image data output from the memory 101 are supplied to the lookup table 105. The lookup table 105 reads and outputs data stored in addresses corresponding to the image data output from the memory 101. The data stored in the lookup table 105 are set such so as to compensate differences in gradation due to variations in characteristics of the cameras. As a result, differences in brightness between the cameras.

The image data, which have been thus subjected to a compensation process for lens aberrations and variations in characteristics of the cameras, are output from the image input portions 100-1 to 100-5 and supplied to the SAD circuits 200-1 to 200-4.

The SAD circuits 200-1 to 200-4 each calculate absolute values of differences for each pixel value between the reference image data output from the image input portion 100-1 and two of other compared image data output from the image input portions 100-2 to 100-5, and then output the calculated values. Incidentally, the calculation executed in each of the SAD circuits 200-1 to 200-4 is selectively changed depending on a value of the effective bit.

More specifically, the image data output from the image input portion 100-1, which have been subjected to the compensation process, are supplied to both the subtracters 201-1 and 201-2. Also, the image data output from the image input portions 100-2 and 100-3 are supplied to the subtracters 201-1 and 201-2, respectively.

The subtracter 201-1 subtracts a pixel value of the image output from the camera 2, i.e., one compared image, from a pixel value of the reference image, and then outputs a difference value. The subtracter 201-2 subtracts a pixel value of the image output from the camera 3, i.e., the other compared image, from the pixel value of the reference image, and then outputs a difference value.

The absolute value circuit 202-1 calculates and outputs an absolute value of the result calculated by the subtracter 201-1. The absolute value circuit 202-2 calculates and outputs an absolute value of the result calculated by the subtracter 201-2. Consequently, the absolute value circuit 202-1 outputs the absolute value of difference for each pixel value between the image output from the image input portion 100-2, i.e., one compared image, and the reference image output from the image input portion 100-1. The absolute value circuit 202-2 outputs the absolute value of difference for each pixel value between the image output from the image input portion 100-3, i.e., the other compared image, and the reference image output from the image input portion 100-1.

When the search area of the camera 2 is within the image region, the selector 203-1 selects an output of the absolute value circuit 202-1 and outputs it to the adder 204 because the effective bit takes a state of "1". the other hand, when the search area of the camera 2 exceeds the image region, the selector 203-1 selects an output of the absolute value circuit 202-2 and outputs it to the adder 204 because the effective bit takes a state of " "

Likewise, when the search area of the camera 3 is within the image region, the selector 203-2 selects an output of the absolute value circuit 202-2 and outputs it to the adder 204 because the effective bit takes a state of "1". On the other hand, when the search area of the camera 3 exceeds the image region, the selector 203-2 selects an output of the absolute value circuit 202-1 and outputs it to the adder 204 because the effective bit takes a state of "0".

The adder 204 adds both outputs of the selectors 203-1 and 203-2, and outputs the sum thereof. The selector 206 selects an output of the adder 204 or the maximum value circuit 205 depending the states of the effective bits for the cameras 2 and 3, and then output the selected one. As a result, the selector 206 outputs one of the following three outputs depending the states of the effective bits for the cameras 2 and 3.

When both the effective bits take a state of "1" (effective), the outputs of the absolute value circuits 202-1 and 202-2 are directly added and the resulting sum is output. When one of the effective bits takes a state of "0" (ineffective), the output of the absolute value circuit in the effective state is doubled and then output. When both the effective bits take a state of "0", the output of the maximum value circuit 205 (e.g., a value 511 in the case of the pixel data being of 8 bits) is selected and output.

The outputs of the SAD circuits 200-1 to 200-4 are supplied respectively to the SSAD circuits 300-1 to 300-4.

The SSAD circuits 300-1 to 300-4 each perform the block matching process in units of a pixel block comprising, for example, 5×5 pixels, and then output obtained results.

More specifically, the absolute value ($|a_{ij}-b_{ij}|$) of difference for each pixel value is supplied to the subtracter 302 and at the same time to the delay line 301. The delay line 301 delays the received absolute value by a period corresponding to the product of the size of a block used for the block matching process by the number of pixels per line, and then supplies the delayed data to the subtracter 302.

The subtracter 302 subtracts the data delayed by the delay line 301 from the data output from the SAD circuit, and then outputs a subtracted result to the adder 303.

The adder 303 adds data output from the memory 304 after being delayed one line and data output from the subtracter 302, and then outputs the sum of both data. As a result, the adder 303 outputs data ($\Sigma_i |a_{ij}-b_{ij}|$) obtained by the one-dimensional process of two-dimensional block matching.

The delay line 305, the subtracter 306, the adder 307 and the memory 308 execute similar processing as the corresponding components in the above preceding stage. As a result, the adder 307 outputs data ($\Sigma_j \Sigma_i |a_{ij}-b_{ij}|$) obtained by the two-dimensional block matching process.

Data output from the SSAD circuits 300-1 to 300-4 are supplied to the second-order portions 401-1 to 400-4, respectively.

The second-order portions 401-1 to 400-4 each perform interpolation for one data $S_2$ and other two data $S_1, S_3$ before and after the data $S_2$, which are output from each of the SSAD circuits 300-1 to 300-4, by using a second-order curve to obtain more accurate minimum value data.

Figure 6:
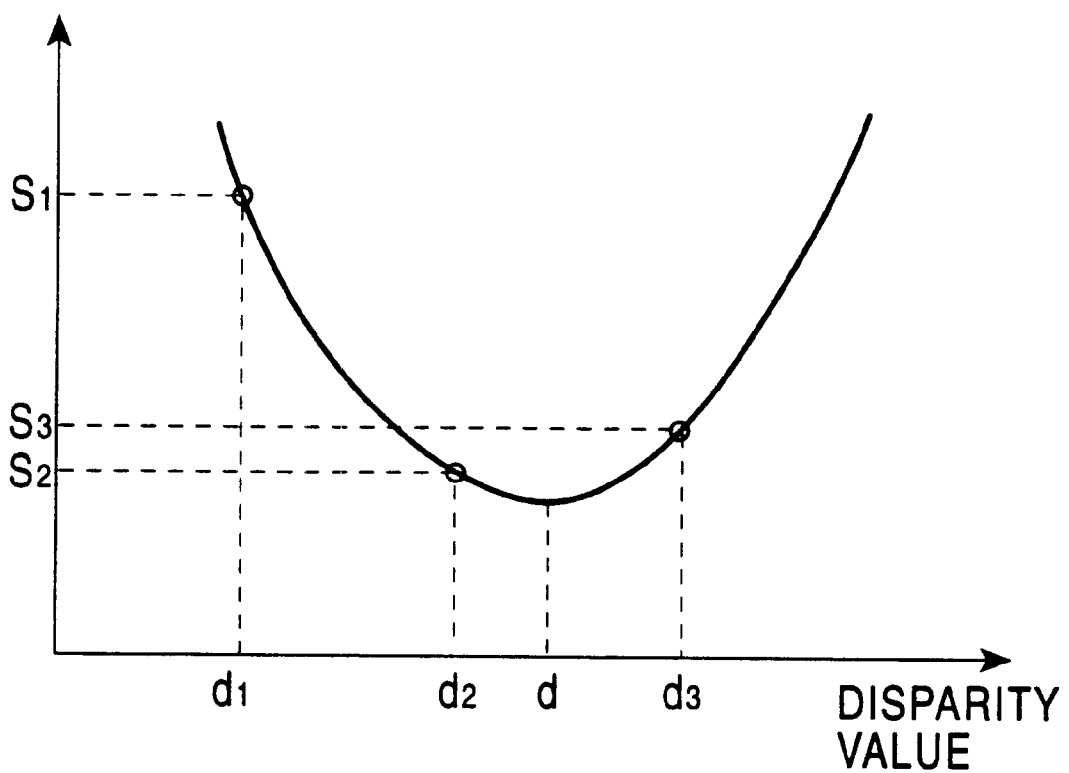
FIG. 6 is a graph for explaining processing executed in a second-order portion shown in FIG. 2.

FIG. 6 is a graph for explaining the operation executed in each second-order portion 400.

As shown in FIG. 6, when outputs $d_1$ to $d_3$ of the SSAD circuit 300 are applied, the second-order portion 400 creates a curve passing $d_1$ to $d_3$ based on the following equations of second degree:

$$S_1 = ad_1^2 + bd_1 + c \quad (1)$$

$$S_2 = ad_2^2 + bd_2 + c \quad (2)$$

$$S_3 = ad_3^2 + bd_3 + c \quad (3)$$

Given now $d_1 = -1$, $d_2 = 0$ and $d_3 = 1$, the above equations (1) to (3) are written below:

$$S_1 = a - b + c \quad (4)$$

$$S_2 = c \quad (5)$$

$$S_3 = a + b + c \quad (6)$$

Solving the above equations (4) to (6), a minimum value d can be expressed by the following equation:

$$d = (S_1 - S_3)/\{2(S_1 - 2S_2 + S_3)\} \quad (7)$$

Here, the range of d can be expressed below:

$$-0.5 \leq d \leq 0.5 \quad (8)$$

Accordingly, doubling both sides of the equation (8) results in:

$$-1 \leq 2d \leq 1 \quad (9)$$

By putting the equation (7) in the equation (9), the following equation is obtained:

$$-1 \leq (S_1 - S_2)/(S_1 - 2S_2 + S_3) \leq 1 \quad (10)$$

Usually, when executing calculation including a division process as shown in the equation (7), a computing cost using hardware is increased. In this embodiment, however, precision of a determined value is at maximum 3 to 4 bits down from a decimal point, and the range of a result to be determined is definite as indicated by the equation (10). In other words, the position representing a precise minimum value, which is to be determined by approximation using a second-order curve, locates in the range of ±0.5 from the position of the calculated minimum value. Accordingly, the calculation can be executed through a subtraction process instead of a division process. It is hence possible to considerably simplify the computing operation and cut down hardware resources needed.

In the above configuration, second-order is carried out upon all data output from the SSA circuit 300, but there occurs no problem because only a minimum value is finally selected by the minimum value selecting portion 500.

The data resulted from the second-order are supplied to the minimum value selecting portion 500. The minimum value selecting portion 500 selects a minimum value from among the data output from the second-order portions 400-1 to 400-4, and outputs the selected minimum value to the minimum value selecting portion 600.

The minimum value selecting portion 600 compares a preceding minimum value stored so far in the result memory 700 with a minimum value newly output from the minimum value selecting portion 500, and then selects and outputs the smaller between both the minimum values. The result memory 700 holds the minimum value output from the minimum value selecting portion 600. Consequently, the result memory 700 selects and stores minimum data from among a series of data obtained for all the camera pairs (i.e., all the combinations of cameras corresponding to every two images applied to the respective SAD circuits).

The resulting minimum data represents data having a maximum degree of matching, and therefore a parallax with the highest accuracy can be obtained.

With the embodiment described above, since the output of the SSAD circuit 300 is subjected to the second-order in the second-order portion 400 and then the minimum value is selected by the minimum value selecting portion 500, the apparatus can be constructed in the pipeline form and operated through parallel distributed processing. Thus, the computation can be executed at high speeds.

Also, since the memory 103 is provided to enable the data to be read in non-linear fashion, an effect of lens aberrations can be canceled. Further, since the lookup table 105 is provided to compensate errors of intensity values attributable to variations in characteristics of the cameras, resulting measurement accuracy is improved.

In addition, two cameras for picking up compared images are selected an one pair, and the matching process is executed for each camera pair such that when the search area is within the image region for both the cameras of the pair, the matching process is executed by using both the images; when the search area is outside the image region for one of the cameras of the pair, the matching process is executed by using the image within which the search area is positioned; and when the search area is outside the image region for both the cameras of the pair, such a maximum value as making the output data ineffective is created and output. Accordingly, even when the search area is positioned outside the image region, a precise result can be calculated.

While five cameras are employed to carry out the measurement in the above embodiment, the present invention is of course not restricted to the illustrated embodiment. Moreover, in the description of this specification, the transmission medium includes not only an information recording medium such as FD and CD-ROM, but also a network transmission medium such as Internet and a digital satellite.

Moreover, in the description of this specification, the transmission medium includes not only an information recording medium such as FD and CD-ROM, but also a network transmission medium such as Internet and a digital satellite.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for calculating a distance to a target point based on images from a plurality of image pickup devices, said apparatus comprising:

first storage means for storing pixel data of respective images from each of said plurality of image pickup devices responding to respective scene patterns, second storage means for storing sequence data for reading out said pixel data, reading means for reading out said pixel data stored in said first storage means in accordance with said sequence data stored in said second storage means, such that lens aberrations of said image pickup devices are cancelled, and means for modifying gradations of said respective pixel data read out by said reading means to provide compensation for variations in characteristics between said image pickup devices such that respective modified pixel data are substantially identical when said respective scene patterns are substantially identical.

2. An apparatus according to claim 1, wherein said sequence data stored in said second storage means are predetermined based on said lens aberrations of each of said image pickup devices.

3. An apparatus according to claim 1, wherein said converting means is operable such that gradations of said plurality of image pickup devices are equal to one another.

4. A method for calculating a distance to a target point based on images from a plurality of image pickup devices, said method comprising:

storing pixel data of respective images from each of said plurality of image pickup devices responding to respective scene patterns, reading out pixel data of said image stored in said storing step in accordance with a stored reading sequence such that lens aberrations of said image pickup devices are cancelled, and modifying gradations of said respective pixel data read out in said reading step to provide compensation for variations in characteristics between said image pickup devices such that respective modified pixel data are substantially identical when said respective scene patterns are substantially identical.

5. A method according to claim 4, wherein said reading sequence is predetermined based on said lens aberrations of each of said image pickup devices.

6. A method according to claim 4, wherein said converting step is operable such that gradations of said plurality of image pickup devices are equal to one another.

7. A transmission medium for transmitting a computer program for use in an apparatus, the apparatus for calculating a distance to a target point based on images from a plurality of image pickup devices, said computer program being capable of causing the apparatus to perform steps comprising:

storing pixel data of respective images from each of said plurality of image pickup devices responding to respective scene patterns, reading out pixel data of said image stored in said storing step in accordance with a stored reading sequence such that lens aberrations of said image pickup devices are cancelled, and modifying gradations of said respective pixel data read out in said reading step to provide compensation for variations in characteristics between said image pickup devices such that respective modified pixel data are substantially identical when said respective scene patterns are substantially identical.

8. An apparatus for calculating a distance to a target point based on images from a plurality of image pickup devices, said apparatus comprising:

first input means for receiving a reference image from one of said plurality of image pickup devices, second input means for receiving a comparison image from another of said image pickup devices, searching means for searching an area of said comparison image that corresponds to a given area of said reference image using a matching-process, detecting means for detecting if said area of said comparison image is outside a valid region of the comparison image, and control means for controlling said matching process performed by said searching means in accordance with a detection result from said detecting means.

9. An apparatus according to claim 8, further comprising storage means for storing data related to a correlation between said reference image and said comparison image, wherein said detecting means detects if said area is outside said valid region of said comparison, image by referring to an effective bit of said data stored in said storage means.

10. An apparatus according to claim 8, wherein said searching means performs said matching process between said reference image and each of first and second comparison images having respective valid regions, and said control means controls said searching means such that:

when said detecting means detects that said search area is within both valid regions of said first and second comparison images, said control means controls said searching means to execute said matching process for both said comparison images, when said detecting means detects that said search area is outside one of said valid regions of said first and second comparison images, said control means controls said searching means to execute said matching process for only said comparison image for which said search area is within said valid region, and when said detecting means detects that said search area is outside both valid regions of said first and second comparison images, said control means controls said searching means to output a predetermined value as a result of said matching process.

11. An apparatus according to claim 8, wherein said matching process calculates absolute values of differences in respective pixel values between said reference image and said comparison image, and determines a minimum value of said calculated absolute values.

12. A method for calculating a distance to a target point based on images from a plurality of image pickup devices, said method comprising:

receiving a reference image from one of said plurality of image pickup devices, receiving a comparison image from another of said image pickup devices, searching an area of said comparison image that corresponds to a given area of said reference image using a matching process, detecting if said area of said comparison image is outside a valid region of said comparison image, and a control step of controlling said matching process performed in said searching step in accordance with a detection result of said detecting step.

13. A method according to claim 12, wherein said detecting step detects if said search area is outside said valid region of said comparison image by referring to an effective bit of said data that is stored and related to a correlation between said reference image and said comparison image.

14. An image processing method according to claim 12, wherein said searching step performs said matching process between said reference image and each of first and second comparison images having respective valid regions, and said control step controls said searching step such that:

when said detecting step detects that said search area is within both valid regions of said first and second comparison images, said control step controls said searching step to execute said matching process for both said comparison images, when said detecting step detects that said search area is outside one of said valid regions of said first and second comparison images, said control step controls said searching step to execute said matching process for only said comparison image for which said search area is within said valid region, and when said detecting step detects that said search area is outside both valid regions of said first and second comparison images, said control step controls said searching step to output a predetermined value as a result of said matching process.

15. An image processing method according to claim 12, wherein said matching process calculates absolute values of differences in respective pixel values between said reference image and said comparison image, and determines a minimum value of said calculated absolute values.

16. A transmission medium for transmitting a computer program for use in an apparatus, the apparatus for calculating a distance to a target point based on images from a plurality of image pickup devices, said computer program being capable of causing the apparatus to perform steps comprising:

receiving a reference image from one of said plurality of image pickup devices, receiving a comparison image from another of said image pickup devices, searching an area of said comparison image that corresponds to a given area of said reference image using a matching process, detecting if said area of said comparison image is outside a valid region of said comparison image, and a control step of controlling said matching process performed in said searching step in accordance with a detection result of said detecting step.

* * * * *

UNITED STATES PATENT AND TRADEMARK OFFICE
CERTIFICATE OF CORRECTION

PATENT NO. : 6,625,301 B2
DATED : September 23, 2003
INVENTOR(S) : Kazuyoshi Hayashi It is certified that error appears in the above-identified patent and that said Letters Patent is hereby corrected as shown below:

Title page,
Item [57], ABSTRACT,
Line 3, after "plurality", insert -- of --.

Column 2,
Line 5, "image" should read -- images --.

Column 8,
Lines 65-66, after "data.", there should be no new paragraph.

Column 9,
Line 66, before "the other hand", insert -- On --.

Column 10,
Line 3, """, should read -- "0". --.
Line 15, after "depending", insert -- on --.
Line 16, "output" should read -- outputs --.

Column 12,
Line 18, "an one" should read -- and one --.

Column 13,
Line 61, "matching-process," should read -- matching process, --.

Column 14,
Line 5, after "comparison", delete ",".
Line 46, delete "a control step of" and insert -- for --.

Column 16,
Lines 12-13, delete "and a control step of" and insert -- for --.

UNITED STATES PATENT AND TRADEMARK OFFICE
CERTIFICATE OF CORRECTION

PATENT NO. : 6,625,301 B2
DATED : September 23, 2003
INVENTOR(S) : Kazuyoshi Hayashi It is certified that error appears in the above-identified patent and that said Letters Patent is hereby corrected as shown below:

<u>Column 16,</u>
Lines 12-13, delete "and a control step of" and insert -- for --.

Signed and Sealed this

Tenth Day of February, 2004

JON W. DUDAS
*Acting Director of the United States Patent and Trademark Office*